(12) United States Patent
Niu et al.

(10) Patent No.: US 9,727,239 B2
(45) Date of Patent: Aug. 8, 2017

(54) ELECTRONIC SYSTEM WITH PARTITIONING MECHANISM AND METHOD OF OPERATION THEREOF

(71) Applicant: Samsung Electronics Co., Ltd., Suwon-si, Gyeonggi-Do (KR)

(72) Inventors: Dimin Niu, Sunnyvale, CA (US); Hongzhong Zheng, Sunnyvale, CA (US); Suhas, Sunnyvale, CA (US); Krishna Malladi, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 62 days.

(21) Appl. No.: 14/725,712

(22) Filed: May 29, 2015

(65) Prior Publication Data

US 2016/0140041 A1 May 19, 2016

Related U.S. Application Data

(60) Provisional application No. 62/079,422, filed on Nov. 13, 2014.

(51) Int. Cl.
*G06F 12/06* (2006.01)
*G06F 3/06* (2006.01)

(52) U.S. Cl.
CPC ..................... *G06F 3/06* (2013.01)

(58) Field of Classification Search
CPC ........................................................ G06F 3/06
See application file for complete search history.

(56) References Cited

U.S. PATENT DOCUMENTS

| 6,295,579 | B1 | 9/2001 | Sukegawa et al. | |
|---|---|---|---|---|
| 7,613,867 | B2 | 11/2009 | Sasaki | |
| 2001/0014931 | A1* | 8/2001 | Aglietti | G06F 12/0842 711/129 |
| 2005/0102486 | A1* | 5/2005 | Lakshmanamurthy | G06F 12/0811 712/1 |
| 2013/0304994 | A1* | 11/2013 | Koob | G06F 12/0842 711/129 |
| 2014/0025890 | A1 | 1/2014 | Bert et al. | |
| 2014/0047166 | A1 | 2/2014 | Asnaashari et al. | |
| 2014/0173211 | A1 | 6/2014 | Loh et al. | |
| 2014/0244921 | A1* | 8/2014 | Alfieri | G06F 5/10 711/104 |

* cited by examiner

*Primary Examiner* — John A Lane
(74) *Attorney, Agent, or Firm* — IP Investment Law Group (57) ABSTRACT

An electronic system includes: an interface block of a storage device configured to process system information from a system device; a memory block of the storage device, coupled to the interface block, partitioned by the interface block configured to process the system information for partitioning the memory block; and a storage block of a storage device, coupled to the memory block, configured to access a data block of the storage block provided to the system device.

20 Claims, 7 Drawing Sheets

ELECTRONIC SYSTEM WITH PARTITIONING MECHANISM AND METHOD OF OPERATION THEREOF

CROSS-REFERENCE TO RELATED APPLICATION(S)

This application claims the benefit of U.S. Provisional Patent Application Ser. No. 62/079,422 filed Nov. 13, 2014, and the subject matter thereof is incorporated herein by reference thereto.

TECHNICAL FIELD

An embodiment of the present invention relates generally to an electronic system, and more particularly to a system with partitioning control.

BACKGROUND

Modern consumer and enterprise electronics, especially devices such as graphical display systems, televisions, projectors, cellular phones, portable digital assistants, client workstations, data center servers, and combination devices, are providing increasing levels of functionality to support modern life. Research and development in the existing technologies can take a myriad of different directions.

The increasing levels of functionality typically require increasing memory and storage. Memory capacity and bandwidth can be key factors in increasing device or system performance and functionality. As with other electronic components or modules, area and cost of memory are traded off with performance and functionality.

Memory data caching can improve device or system performance and functionality.

Unfortunately data caching can consume a large amount of memory bandwidth, introduce memory access conflicts, and consume system resources, all of which reduce the system performance and functionality. Embodiments of the invention provide improved memory transactions for data caching.

Thus, a need still remains for an electronic system with partitioning mechanism to improve system performance. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an electronic system including: an interface block of a storage device configured to process system information from a system device; a memory block of the storage device, coupled to the interface block, partitioned by the interface block configured to process the system information for partitioning the memory block; and a storage block of the storage device, coupled to the memory block, configured to access a data block of the storage block provided to the system device.

An embodiment of the present invention provides a method of operation of an electronic system including: operating an interface block of a storage device configured to process system information from a system device; partitioning a memory block of the storage device by the interface block configured to process the system information for partitioning the memory block; and accessing a storage block of the storage device configured to provide a data block of the storage block to the system device.

An embodiment of the present invention provides a non-transitory computer readable medium including stored thereon instructions to be executed by a control unit including: operating an interface block of a storage device configured to process system information from a system device; partitioning a memory block of the storage device by the interface block configured to process the system information for partitioning the memory block; and accessing a storage block of the storage device configured to provide a data block of the storage block to the system device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

In an embodiment of the invention, dynamic cache partitioning based on system information, can provide improved system performance. The dynamic cache partitioning can be transparent to user applications or programs as well as provide system level quality of service (QoS) at least at a storage device such as a non-volatile memory (NVM) device. The dynamic cache partitioning based on system information can improve system performance and QoS with multiple threads concurrently accessing the storage device.

In an embodiment of the invention, Non-Volatile Memory Express (NVMe) drives can provide benefits to computing systems including a high performance, scalable host controller interface, Peripheral Component Interconnect Express (PCIe) based Solid-State Drives (SSD), and improved performance of Non-Volatile Memory in Enterprise and Client platforms.

In an embodiment of the invention, NVMe drives can be configured as a backend for dynamic random access memory (DRAM). Similarly, Serial Advanced Technology Attachment (SATA) SSD can be configured as a frontend for Hard Disk Drives (HDD). This is due in part to cost versus performance for these and other storage or memory technologies.

For example, HDD are considered the lowest cost with the lowest performance, Flash drives or SSD are considered lower cost with lower performance, DRAM is considered higher cost with higher performance, and static random access memory (SRAM) is considered the highest cost with the highest performance. HDD to DRAM or SRAM is approximately a thousand times (1000×) performance gap, and Flash or SSD to DRAM or SRAM is approximately a hundred times (100×) performance gap.

In an embodiment, NVMe is a scalable host controller interface designed to address the needs of Enterprise, Data Center and Client systems with PCIe based SSD. An NVMe drive can achieve speeds several times faster than a SATA SSD. Thus, NVMe storage technology can be implemented in datacenter applications or implementations. A DRAM can be implemented as a cache for flash devices such as NVMe devices providing comparable performance to DRAM at a cost of flash memory. System level information of input and output (I/O) requests can be useful to effectively utilize the DRAM cache to provide Quality of Service (QoS) function for the NVMe device.

For example, the DRAM cache inside the NVMe device can be exhausted or allocated by programs running on the host, impacting the performance of other programs running on the host at least due to starvation problems based on host timeouts, errors, or combination thereof, of NVMe device. Application or thread-level QoS cannot be guaranteed at least in part due to unavailable system level information of input and output (I/O) requests.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

Figure 1:
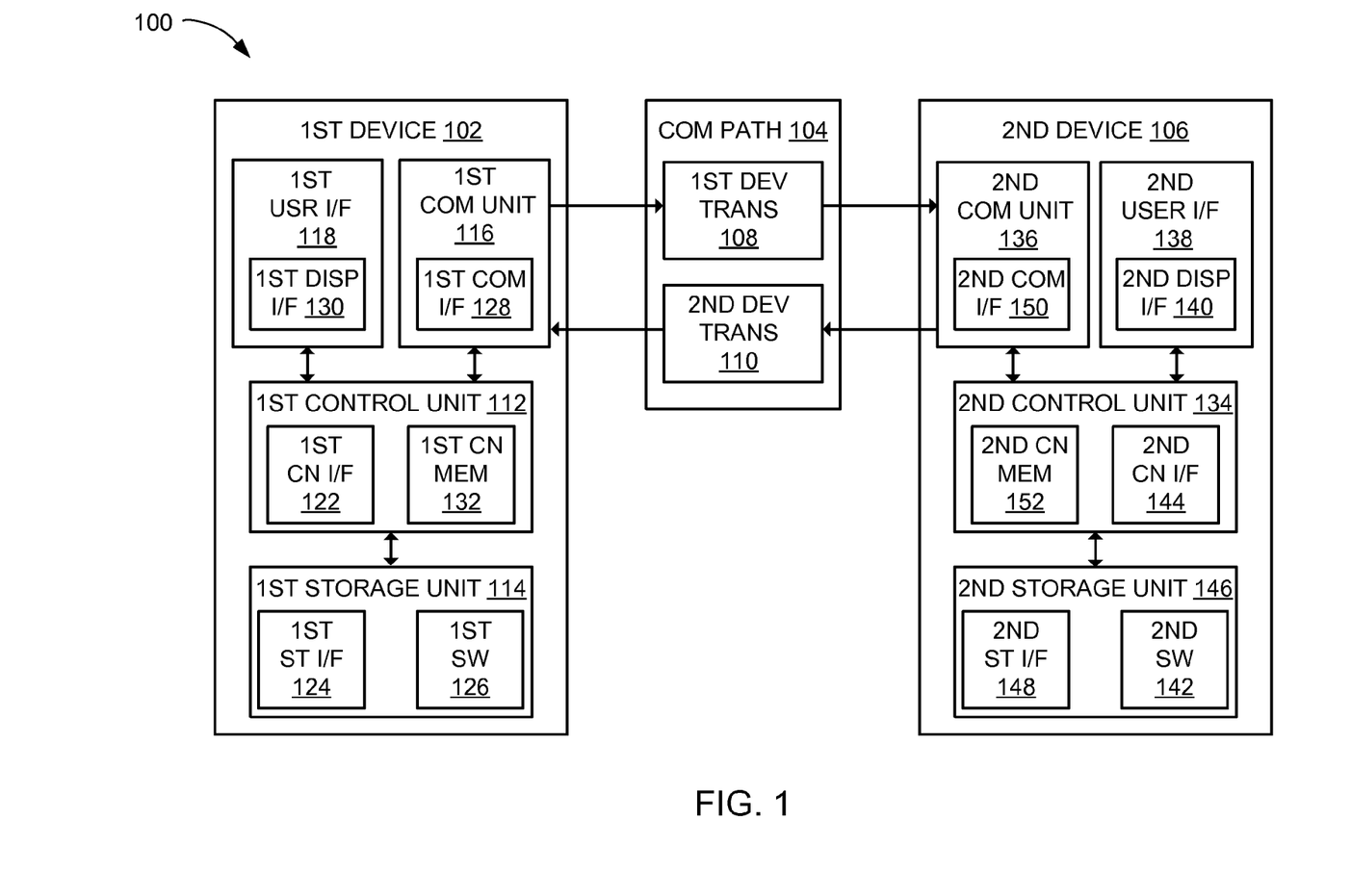
FIG. 1 is a block diagram of an electronic system in an embodiment of the invention.

Referring now to FIG. 1, therein is shown an electronic system 100 in an embodiment of the invention. The electronic system 100 includes a first device 102, such as a client or a server, a communication path 104, such as a wireless or wired network, or combination thereof. The first device 102 can couple with a second device 106, such as a client or server. The first device 102 can couple with the communication path 104 to couple with the second device 106. For example, the first device 102 can be of any of a variety of devices, such as a client, a server, a cellular phone, personal digital assistant, a notebook computer, other multi-functional device, or combination thereof. The first device 102 can couple, either directly or indirectly, to the communication path 104 to communicate with the second device 106 or can be a stand-alone device.

For illustrative purposes, the electronic system 100 is shown with the second device 106 and the first device 102 as end points of the communication path 104, although it is understood that the electronic system 100 can have a different partition between the first device 102, the second device 106, and the communication path 104. For example, the first device 102, the second device 106, or a combination thereof can also function as part of the communication path.

In an embodiment, the communication path 104 can span and represent a variety of networks. For example, the communication path 104 can include system bus, wireless communication, wired communication, optical, ultrasonic, or the combination thereof. Peripheral Component Interconnect Express (PCIe), Peripheral Component Interconnect (PCI), Industry Standard Architecture (ISA), Serial Advanced Technology Attachment (SATA), Small Computer Serial Interface (SCSI), Enhanced Integrated Drive Electronics (EIDE), and accelerated graphics port (AGP), are examples of system bus technologies. Satellite, cellular, Bluetooth, and wireless fidelity (WiFi), are examples of wireless communication. Ethernet, digital subscriber line (DSL), and fiber to the home (FTTH), are examples of wired communication. All of the aforementioned can be included in the communication path 104.

In an embodiment, the first device 102 can include a first control unit 112, a first storage unit 114, a first communication unit 116, and a first user interface 118. The first control unit 112 can include a first control interface 122. The first control unit 112 can execute a first software 126 to provide the intelligence of the electronic system 100. The first control unit 112 can be implemented in a number of different manners.

For example, the first control unit 112 can be a processor, an application specific integrated circuit (ASIC) an embedded processor, a microprocessor, a hardware control logic, a hardware finite state machine (FSM), a digital signal processor (DSP), an field programmable gate array (FPGA), or a combination thereof. The first control interface 122 can be used for communication between the first control unit 112 and other functional units in the first device 102. The first control interface 122 can also be used for communication that is external to the first device 102.

In an embodiment, the first control interface 122 can receive information from the other functional units or from external sources, or can transmit information to the other functional units or to external destinations. The external sources and the external destinations refer to sources and destinations external to the first device 102. The first control interface 122 can be implemented in different ways and can include different implementations depending on which functional units or external units are being interfaced with the first control interface 122. For example, the first control interface 122 can be implemented with a pressure sensor, an inertial sensor, a microelectromechanical system (MEMS), optical circuitry, waveguides, wireless circuitry, wireline circuitry, or a combination thereof.

In an embodiment, the first storage unit 114 can store the first software 126. The first storage unit 114 can also store the relevant information, such as data, images, sound files, or a combination thereof. The first storage unit 114 can be a volatile memory, a nonvolatile memory, an internal memory, an external memory, or a combination thereof. For example, the first storage unit 114 can be a nonvolatile storage such as non-volatile random access memory (NVRAM), non-volatile memory (NVM), non-volatile memory express (NVMe), Flash memory, disk storage, or a volatile storage such as static random access memory (SRAM).

In an embodiment, the first storage unit 114 can include a first storage interface 124. The first storage interface 124 can be used for communication between the first storage unit 114 and other functional units in the first device 102. The first storage interface 124 can also be used for communication that is external to the first device 102. The first storage interface 124 can receive information from the other functional units or from external sources, or can transmit information to the other functional units or to external destinations. The external sources and the external destinations refer to sources and destinations external to the first device 102.

In an embodiment, the first storage interface 124 can include different implementations depending on which functional units or external units are being interfaced with the first storage unit 114. The first storage interface 124 can be implemented with technologies and techniques similar to the implementation of the first control interface 122.

In an embodiment, the first communication unit 116 can enable external communication to and from the first device 102. For example, the first communication unit 116 can permit the first device 102 to communicate with the second device 106 of FIG. 1, an attachment, such as a peripheral device or a computer desktop, and the communication path 104. The first communication unit 116 can also function as a communication hub allowing the first device 102 to function as part of the communication path 104 and not limited to be an end point or terminal unit to the communication path 104. The first communication unit 116 can include active and passive components, such as microelectronics or an antenna, for interaction with the communication path 104.

In an embodiment, the first communication unit 116 can include a first communication interface 128. The first communication interface 128 can be used for communication between the first communication unit 116 and other functional units in the first device 102. The first communication interface 128 can receive information from the other functional units or can transmit information to the other functional units. The first communication interface 128 can include different implementations depending on which functional units are being interfaced with the first communication unit 116. The first communication interface 128 can be implemented with technologies and techniques similar to the implementation of the first control interface 122.

In an embodiment, the first user interface 118 allows a user (not shown) to interface and interact with the first device 102. The first user interface 118 can include an input device and an output device. Examples of the input device of the first user interface 118 can include a keypad, a touchpad, soft-keys, a keyboard, a microphone, an infrared sensor for receiving remote signals, or any combination thereof to provide data and communication inputs.

In an embodiment, the first user interface 118 can include a first display interface 130. The first display interface 130 can include a display, a projector, a video screen, a speaker, or any combination thereof. The first display interface 130 can display information stored in a first control memory 132 of the first control unit 112. The first control memory 132 can include a memory device including a volatile memory device such as static random access memory (SRAM), dynamic random access memory (DRAM), other memory technology device, or combination thereof.

In an embodiment, the first control unit 112 can operate the first user interface 118 to display information generated by the electronic system 100. The first control unit 112 can also execute the first software 126 for the other functions of the electronic system 100, storage in the first control memory 132, or combination thereof. The first control unit 112 can further execute the first software 126 for interaction with the communication path 104 via the first communication unit 116.

In an embodiment, the second device 106 can be optimized for implementing an embodiment of the present invention in a multiple device embodiment with the first device 102. The second device 106 can provide the additional or higher performance processing power compared to the first device 102. The second device 106 can include a second control unit 134, a second communication unit 136, and a second user interface 138.

In an embodiment, the second user interface 138 allows a user (not shown) to interface and interact with the second device 106. The second user interface 138 can include an input device and an output device. Examples of the input device of the second user interface 138 can include a keypad, a touchpad, soft-keys, a keyboard, a microphone, or any combination thereof to provide data and communication inputs. Examples of the output device of the second user interface 138 can include a second display interface 140. The second display interface 140 can include a display, a projector, a video screen, a speaker, or any combination thereof.

In an embodiment, the second control unit 134 can execute a second software 142 to provide the intelligence of the second device 106 of the electronic system 100. The second software 142 can operate in conjunction with the first software 126. The second control unit 134 can provide additional performance compared to the first control unit 112. The second control unit 134 can operate the second user interface 138 to display information. The second control unit 134 can also execute the second software 142 for the other functions of the electronic system 100, including operating the second communication unit 136 to communicate with the first device 102 over the communication path 104.

In an embodiment, the second control unit 134 can be implemented in a number of different manners. For example, the second control unit 134 can be a processor, an embedded processor, a microprocessor, hardware control logic, a hardware finite state machine (FSM), a digital signal processor (DSP), an field programmable gate array (FPGA), or a combination thereof. The second control unit 134 can include a second controller interface 144. The second controller interface 144 can be used for communication between the second control unit 134 and other functional units in the second device 106. The second controller interface 144 can also be used for communication that is external to the second device 106.

In an embodiment, the second controller interface 144 can receive information from the other functional units or from external sources, or can transmit information to the other functional units or to external destinations. The external sources and the external destinations refer to sources and destinations external to the second device 106. The second controller interface 144 can be implemented in different ways and can include different implementations depending on which functional units or external units are being interfaced with the second controller interface 144. For example, the second controller interface 144 can be implemented with a pressure sensor, an inertial sensor, a microelectromechanical system (MEMS), optical circuitry, waveguides, wireless circuitry, wireline circuitry, or a combination thereof.

In an embodiment, a second storage unit 146 can store the second software 142. The second storage unit 146 can also store the relevant information such as data, images, sound files, or a combination thereof. The second storage unit 146 can be sized to provide the additional storage capacity to supplement the first storage unit 114. For illustrative purposes, the second storage unit 146 is shown as a single element, although it is understood that the second storage unit 146 can be a distribution of storage elements. Also for illustrative purposes, the electronic system 100 is shown with the second storage unit 146 as a single hierarchy storage system, although it is understood that the electronic system 100 can have the second storage unit 146 in a different configuration.

For example, the second storage unit 146 can be formed with different storage technologies forming a memory hierarchal system including different levels of caching, main memory, rotating media, or off-line storage. The second storage unit 146 can be a volatile memory, a nonvolatile memory, an internal memory, an external memory, or a combination thereof. Further for example, the second storage unit 146 can be a nonvolatile storage such as non-volatile random access memory (NVRAM), Flash memory, disk storage, or a volatile storage such as static random access memory (SRAM).

In an embodiment, the second storage unit 146 can include a second storage interface 148. The second storage interface 148 can be used for communication between the second storage unit 146 and other functional units in the second device 106. The second storage interface 148 can also be used for communication that is external to the second device 106.

In an embodiment, the second storage interface 148 can receive information from the other functional units or from external sources, or can transmit information to the other functional units or to external destinations. The external sources and the external destinations refer to sources and destinations external to the second device 106. The second storage interface 148 can include different implementations depending on which functional units or external units are being interfaced with the second storage unit 146. The second storage interface 148 can be implemented with technologies and techniques similar to the implementation of the second controller interface 144. The second communication unit 136 can enable external communication to and from the second device 106. For example, the second communication unit 136 can permit the second device 106 to communicate with the first device 102 over the communication path 104.

In an embodiment, the second communication unit 136 can also function as a communication hub allowing the second device 106 to function as part of the communication path 104 and not limited to be an end point or terminal unit to the communication path 104. The second communication unit 136 can include active and passive components, such as microelectronics or an antenna, for interaction with the communication path 104. The second communication unit 136 can include a second communication interface 150. The second communication interface 150 can be used for communication between the second communication unit 136 and other functional units in the second device 106. The second communication interface 150 can receive information from the other functional units or can transmit information to the other functional units.

In an embodiment, the second communication interface 150 can include different implementations depending on which functional units are being interfaced with the second communication unit 136. The second communication interface 150 can be implemented with technologies and techniques similar to the implementation of the second controller interface 144. The first communication unit 116 can couple with the communication path 104 to send information to the second device 106 in the first device transmission 108. The second device 106 can receive information in the second communication unit 136 from the first device transmission 108 of the communication path 104.

In an embodiment, the second communication unit 136 can couple with the communication path 104 to send information to the first device 102 in the second device transmission 110. The first device 102 can receive information in the first communication unit 116 from the second device transmission 110 of the communication path 104. The electronic system 100 can be executed by the first control unit 112, the second control unit 134, or a combination thereof.

For illustrative purposes, the second device 106 is shown with the partition having the second user interface 138, the second storage unit 146, the second control unit 134, and the second communication unit 136, although it is understood that the second device 106 can have a different partition. For example, the second software 142 can be partitioned differently such that some or all of its function can be in the second control unit 134 and the second communication unit 136. Also, the second device 106 can include other functional units not shown in FIG. 1 for clarity.

In an embodiment, in a manner similar to the first control unit 112, the second control unit 134 can include a second control memory 152 with a memory device including a volatile memory device such as static random access memory (SRAM), dynamic random access memory (DRAM), other memory technology device, or combination thereof. Functions of the electronic system 100 can store information in the second control memory 152 for use by other functional units.

In an embodiment, the functional units in the first device 102 can work individually and independently of the other functional units. The first device 102 can work individually and independently from the second device 106 and the communication path 104. Similarly, the functional units in the second device 106 can work individually and independently of the other functional units. The second device 106 can work individually and independently from the first device 102 and the communication path 104. For illustrative purposes, the electronic system 100 is described by operation of the first device 102 and the second device 106. It is understood that the first device 102 and the second device 106 can operate any of the functions, processes, applications, or combination thereof, of the electronic system 100.

In an embodiment, the functions, processes, applications, or combination thereof, described in this application can be at least in part implemented as instructions stored on a non-transitory computer readable medium to be executed by a control unit 112. The non-transitory computer medium can include the storage unit 114. The non-transitory computer readable medium can include non-volatile memory, such as a hard disk drive (HDD), non-volatile random access memory (NVRAM), solid-state storage device (SSD), compact disk (CD), digital video disk (DVD), universal serial bus (USB) flash memory devices, Blu-ray Disc™, any other computer readable media, or combination thereof. The non-transitory computer readable medium can be integrated as a part of the electronic system 100 or installed as a removable portion of the electronic system 100.

In an embodiment, the functions, processes, applications, or combination thereof, described in this application can be implemented as instructions stored on a non-transitory computer readable medium to be executed by a first control unit 112, the second control unit 134, or a combination thereof. The non-transitory computer medium can include the first storage unit 114, the second storage unit 146, or a combination thereof. The non-transitory computer readable medium can include non-volatile memory, such as a hard disk drive (HDD), non-volatile random access memory (NVRAM), solid-state storage device (SSD), compact disk (CD), digital video disk (DVD), universal serial bus (USB) flash memory devices, Blu-ray Disc™, any other computer readable media, or combination thereof. The non-transitory computer readable medium can be integrated as a part of the electronic system 100 or installed as a removable portion of the electronic system 100.

In an embodiment, the functions, processes, applications, or combination thereof, described in this application can be part of the first software 126, the second software 142, or a combination thereof. These functions, processes, applications, or combination thereof, can also be stored in the first storage unit 114, the second storage unit 146, or a combination thereof. The first control unit 112, the second control unit 134, or a combination thereof can execute these functions, processes, applications, or combination thereof, for operating the electronic system 100.

In an embodiment, the electronic system 100 has been described with functions, processes, applications, order, or combination thereof, as an example. The electronic system 100 can partition the functions, processes, applications, or combination thereof, differently or order the functions, processes, applications, or combination thereof, differently. The functions, processes, applications, or combination thereof, described in this application can be software, hardware implementation, hardware circuitry, or hardware accelerators in the first control unit 112 or in the second control unit 134. The functions, processes, applications, or combination thereof, can also be hardware implementation, hardware circuitry, or hardware accelerators within the first device 102 or the second device 106 but outside of the first control unit 112 or the second control unit 134, respectively.

Figure 2:
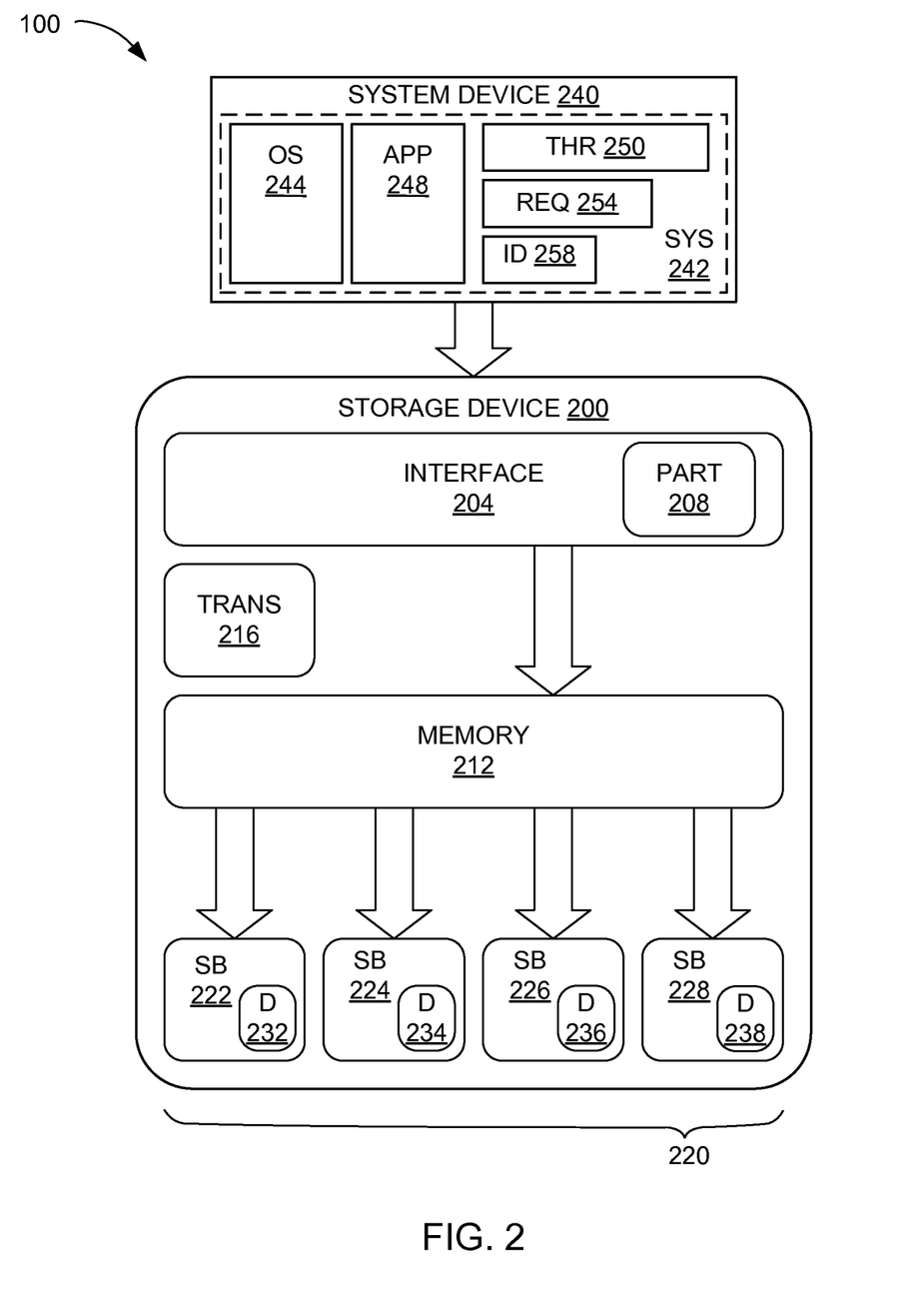
FIG. 2 is a block diagram of the electronic system in an embodiment of the invention.

Referring now to FIG. 2, therein is shown a block diagram of the electronic system 100 in an embodiment of the invention. The electronic system 100 can include a storage device 200 providing a high performance, scalable interface. The electronic system 100 with the storage device 200 can provide improved performance of non-volatile memory with enterprise architectures, client architectures, or combination thereof, due at least in part to optimizing memory devices based on cost versus performance.

In an embodiment, the storage device 200 can include an interface block 204, a partition block 208, a memory block 212, a transition block 216, storage block 220, or combination thereof. The interface block 204, the partition block 208, the memory block 212, the transition block 216, and the storage block 220, are implemented at least in part as hardware such as integrated circuits, integrated circuit cores, integrated circuit components, microelectromechanical system (MEMS), passive devices, or a combination thereof. For illustrative purposes, the interface block 204, the partition block 208, the memory block 212, the transition block 216, and the storage block 220, are shown as discrete blocks although it is understood that any of the blocks can share portions of the hardware with any of the other blocks.

For example, the transition block 216, such as a flash transition layer, can provide translation for file systems, particularly sector based file systems, and block based storage devices such as flash memory. The transition block 216 can translate the storage block 220 to appear as a sector based storage device, such as a disk drive, to the file system of the system device 240.

In an embodiment, the storage block 220 can include a first storage sub-block 222, a second storage sub-block 224, a third storage sub-block 226, a fourth storage sub-block 228, or combination thereof. The storage block 220, the first storage sub-block 222, the second storage sub-block 224, the third storage sub-block 226, the fourth storage sub-block 228, or combination thereof, can be implemented as non-volatile memory (NVM), non-volatile memory express (NVMe), flash memory, solid state memory, any memory technology, any storage technology, or combination thereof. For illustrative purposes, the storage block 220 is shown with four storage sub-blocks, although it is understood that the storage block 220 may be a single block with no sub-blocks or have any number of sub-blocks.

In an embodiment, the interface block 204 can be operated to identify an origin of a request for determining a partition for storing requests, threads, system, application, other information, or combination thereof. The request can result in accessing the storage block 220 for providing a first data block 232, a second data block 234, a third data block 236, a forth data block 238, or combination thereof. For illustrative purposes, four data blocks, such as the first data block 232, the second data block 234, the third data block 236, the forth data block 238, or combination thereof, are shown, although it is understood that the storage block 220 may include any number or configuration of data blocks with no sub-blocks or any number of sub-blocks.

In an embodiment, the storage device 200 can be implemented at least in part with the first storage unit 114, the second storage unit 146, or combination thereof. The storage device 200 can include the interface block 204 such as a host interface controller, for communicating, interacting, interfacing, or combination thereof, with a host device such as the first control unit 112, the second control unit 134, or combination thereof. The storage device 200 can provide information, data, instructions, input, output, send, receive, request, response, acknowledgement, or combination thereof.

In an embodiment, the interface block 204 can include a partitioning mechanism implemented as the partition block 208 such as quality of service (QoS) controller, cache QoS controller, a dynamic random access memory (DRAM) cache QoS controller, or combination thereof. The partition block 208 can provide quality of service (QoS) control for a cache such as cache memory including random access memory (RAM), dynamic random access memory (DRAM), static random access memory (SRAM), volatile memory, other memory technology, or combination thereof. The partition block 208 can partition memory, such as cache memory, in partitions such as sub-partitions based on system information such as requests, threads, system, application, other information, or combination thereof.

In an embodiment, the interface block 204 can dynamically or actively change a partition size such as increase or decrease a portion of a cache allocated to a virtual device or machine. The interface block 204 can dynamically or actively change partitions based on a request for accessing data, accumulated requests for data, a demand for data, or combination thereof. The dynamically or actively changing partitions or partitioning of the memory block 212 can be implemented at system runtime for significantly improved performance and avoiding memory or storage starvation issues based on the system information 242 provided to the interface block 204.

In an embodiment, the storage device 200 can include non-volatile memory, such as non-volatile memory (NVM), non-volatile memory express (NVMe), flash memory, solid state memory, any memory technology, any storage technology, or combination thereof, connected to the first control unit 112, the second control unit 134, or combination thereof with a communication interface such as the communication path 104 including a serial interface, a high speed interface, Peripheral Component Interconnect Express (PCIe), other interface technology, or combination thereof.

In an embodiment, a system device 240, such as the first device 102 of FIG. 1, the second device 106 of FIG. 1, or combination thereof, can include system information 242 such as operating system (OS) information 244, application (app) information 248, or combination thereof. The operating system information 244 of the system device 240 can provide requests, information, processing, or combination thereof. Application information 248, optionally with the operating system information 244, can be implemented on the system device 240 for performing user functions, programs, interface, or combination thereof.

In an embodiment, the system device 240, the storage device 200, the interface block 204, the partition block 208, or combination thereof, can be operated to process the system information 242 including thread information 250, request information 254, identification 258, or combination thereof. The thread information 250 can include the request information 254, the identification 258 or combination thereof. The thread information 250 can include related request information 254 with common identification 258 for distinguishing or identifying requests, threads, applications 248, or combination thereof.

In an embodiment, the identification 258 can be a unique inclusion with the request information 254, such as number appended to each of the request information 254. The identification 258 can be provided by the system device 240, the operating system information 244, the application information 248, or combination thereof. For example, the interface block 204, partition block 208, or combination thereof, can be operated to provide dynamic or active partitioning of the memory block 212 at runtime based on system information 242 including control unit, storage unit, communication unit, operating system (OS) 244, application 248, thread 250, thread-level quality of service (QoS), request 254, identification 258, or combination thereof.

In an embodiment, the request information 254, the thread information 250, or combination thereof, can be determined by the system device 240. Additionally or alternatively, the request information 254, the thread information 250, or combination thereof, can be determined by the interface block 204, the partition block 208, or combination thereof, based on system information 242, such as control unit, storage unit, communication unit, operating system (OS) 244, application 248, thread 250, thread-level quality of service (QoS), request 254, identification 258, or combination thereof, provided by the system device 240.

In an embodiment, the system device 240, the storage device 200, or combination thereof, can provide mechanisms for identifying system information 242, such as control unit, storage unit, communication unit, application 248, operating system (OS) 244, or combination thereof, for the interface block 204, the partition block 208, or combination thereof. The partition block 208 can receive and process thread-level quality of service (QoS) information including the system information 242, the application information 248, the operating system (OS) information 244, or combination thereof.

In an embodiment, the storage device 200 including the interface block 204 can provide dynamic or active partitioning including adaptive partitioning, uniform partitioning, per demand partitioning, shared partitioning, private partitioning, or combination thereof. The dynamic or active partitioning can include system information 242 including control unit, storage unit, communication unit, operating system (OS) 244, application 248, thread-level quality of service (QoS) information, request 254, identification 258, or combination thereof, for quality of service (QoS) requirements. The dynamic or active partitioning of the memory block 212 can include information for quality of service (QoS) requirements to identify and solve starvation issues or problems for the storage device 200.

In an embodiment, the storage device 200 can process OS information 244, application information 248, or combination thereof, for dynamic or active partitioning of the memory block 212 such as a cache, which can include dynamic random access memory, static random access memory, any memory technology, or combination thereof. The dynamic or active partitioning of the memory block 212 can provide system-level quality of service (QoS), including OS-level QoS, in the storage device 200 with attaching or assigning the request information 254 of each thread information 250 to a specific partition of the memory block 212.

In an embodiment, the storage device 200 including the interface block 204 and the partition block 208 can identify and solve memory starvation of the storage device 200. The storage device 200 can determine starvation problems based on timeouts, errors, or combination thereof for the system device 240, the storage device 200, or combination thereof. The storage block 220 can be exhausted or allocated by requests. Requests from a particular application or system operation can impact access or performance of other applications or operations.

It has been discovered that the electronic system 100 including the storage device 200 with the interface block 204, the partition block 208, or combination thereof, avoids performance degradation of more than sixty percent (60%) due to the memory starvation problems. The interface block 204, the partition block 208, or combination thereof, can dynamically or actively change partitions of the memory block 212, significantly improving system performance and avoiding memory starvation problems.

Figure 3:
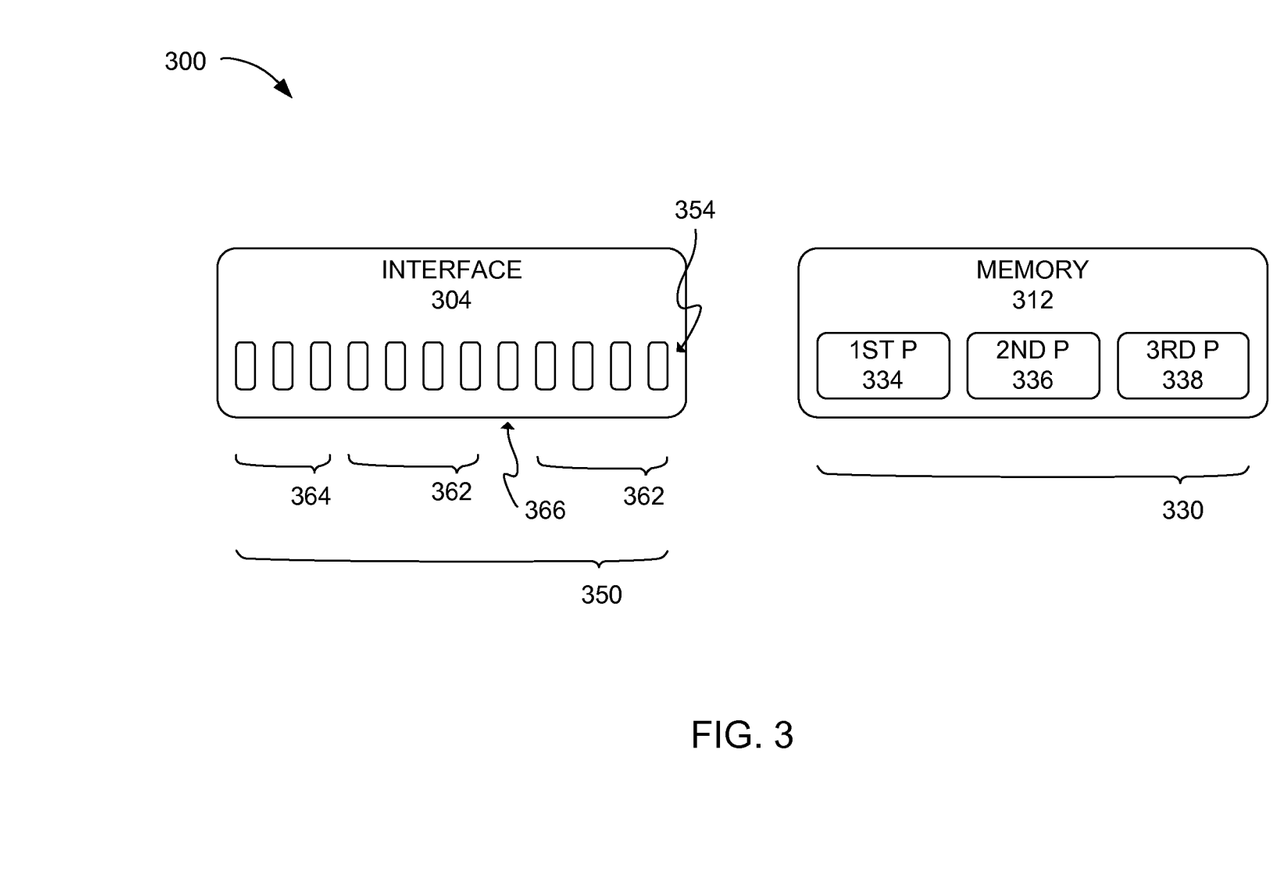
FIG. 3 is a block diagram of a portion of a storage device of the electronic system in an embodiment of the invention.

Referring now to FIG. 3, therein is shown a portion of a block diagram of a storage device 300 of the electronic system 100 in an embodiment of the invention. The storage device 300 is shown for clarity with only an interface block 304 and a memory block 312. For illustrative purposes, the storage device 300 is shown with the interface block 304 and the memory block 312 although it is understood that the storage device 300 may include other components including components of the storage block 200 of FIG. 2. For example, the interface block 304 can include a partition block such as the partition block 208 of FIG. 2.

In an embodiment, the storage device 300 can include an interface block 304, a memory block 312, or combination thereof. The interface block 304 and the memory block 312 are implemented at least in part as hardware such as integrated circuits, integrated circuit cores, integrated circuit components, microelectromechanical system (MEMS), passive devices, or a combination thereof. For illustrative purposes, the interface block 304 and the memory block 312, are shown as discrete block although it is understood that any of the blocks can share portions of hardware with other blocks.

In an embodiment, the storage device 300 can be implemented at least in part with the first storage unit 114, the second storage unit 146, or combination thereof. The storage device 302 can include the interface block 304 such as a host interface controller, for communicating, interacting, interfacing, or combination thereof, with a host device such as the first control unit 112, the second control unit 134, or combination thereof. The storage device 300 can provide information, data, instructions, input, output, send, receive, request, response, acknowledgement, or combination thereof.

In an embodiment, the memory block 312 can include partitioning. For example the memory device 312 can include partitions 330 such as a first partition 334, a second partition 336, a third partition 338, or combination thereof. For illustrative purposes, the memory device 312 is shown with three partitions 330 although it is understood that the memory device 312 may include any number of partitions.

In an embodiment, the storage device 300 with the interface block 304 can provide uniform partitioning of the memory block 312. The interface block 304 can provide counting or determining a number of threads 350 of requests 354. The interface block 304 can provide evenly dividing or partitioning the memory block 312 based on the number of the threads 350. For illustrative purposes, the interface block 304 is shown with three of the threads 350 although it is understood that the interface block 304 may include any number of threads 350.

For example, the interface block 304 can determine by counting the number of the threads 350 including a first thread 362, a second thread 364, and a third thread 366. The interface block 304 can evenly divide or partition the memory block 312 in three equal partitions based on the three threads for associating one of the partitions 330 with each of the requests 354 or threads 350. Each of the partitions 330 can serve each of the threads 350, such as the first partition 334 can serve the first thread 362, the second partition 336 can server the second thread 364, the third partition 338 can serve the third thread 366, or combination thereof.

In an embodiment, the interface block 304 can provide partitioning or dividing of the memory block 312, based on the number of threads 350, into three partitions, each with the same capacity. This uniform partitioning or dividing provides equal or uniform partitions of the memory block 312 for each of the first thread 362, the second thread 364, and the third thread 366. For illustrative purposes, the memory device 312 is shown with three partitions 330 and the interface block 304 is shown with three of the number threads 350, although it is understood that the memory device 312 may include any number of partitions and the interface block 304 may include any number of threads 350.

It has been discovered that electronic system 100 including the storage device 300 with the partitions 330, significantly improves system performance and avoids memory starvation problems for significantly improve quality of service (QoS) particularly at thread-level. The interface block 204, the partition block 208, or combination thereof, can dynamically or actively change uniform partitions of the memory block 312 such as the first partition 334, the second partition 336, the third partition 338, or combination thereof.

Figure 4:
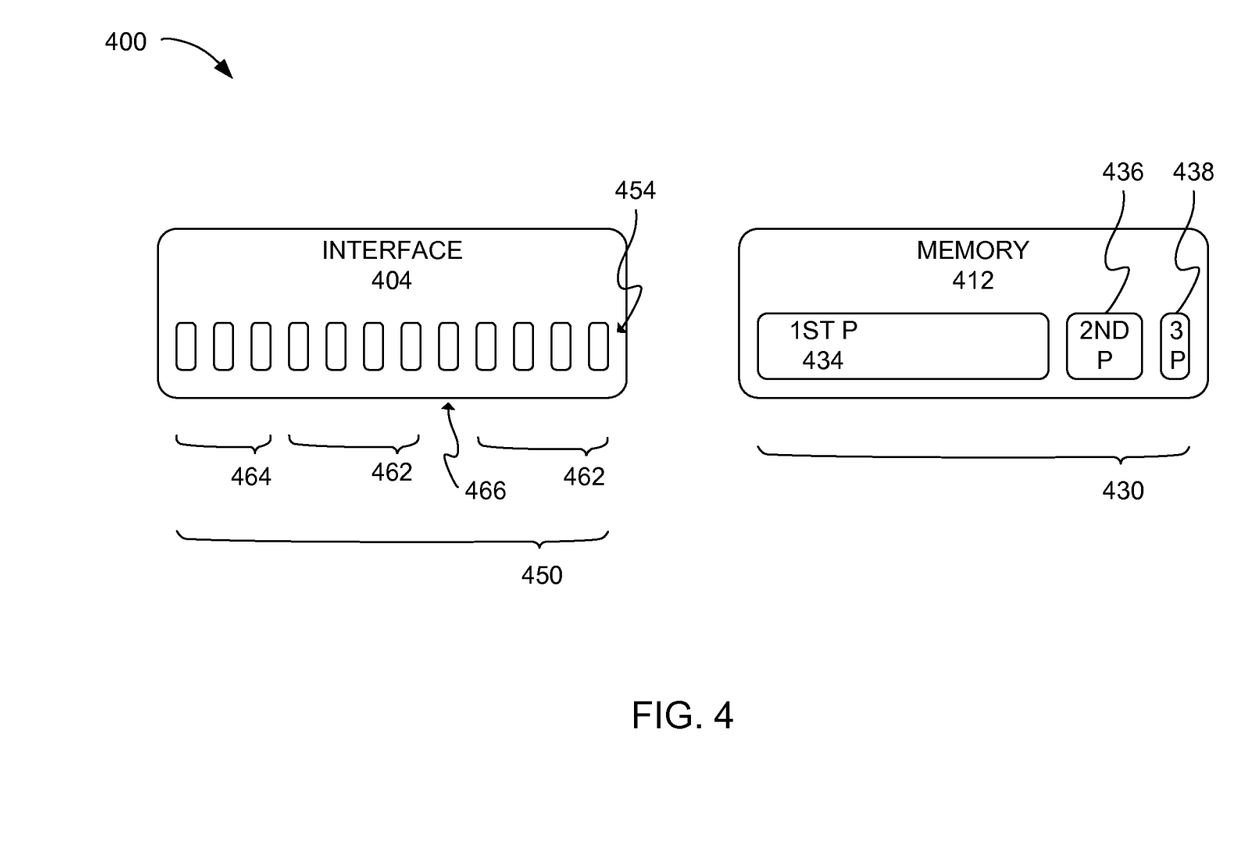
FIG. 4 is a block diagram of a portion of a storage device of the electronic system in an embodiment of the invention.

Referring now to FIG. 4, therein is shown of a portion a block diagram of a memory device 400 of the electronic system 100 in an embodiment of the invention. The storage device 400 is shown for clarity with only an interface block 404 and a memory block 412. For illustrative purposes, the storage device 400 is shown with the interface block 404 and the memory block 412 although it is understood that the storage device 400 may include other components including components of the storage block 200 of FIG. 2. For example, the interface block 304 can include a partition block such as the partition block 208 of FIG. 2.

In an embodiment, the storage device 400 can include an interface block 404, a memory block 412, or combination thereof. The an interface block 404 and the memory block 412 are implemented at least in part as hardware such as integrated circuits, integrated circuit cores, integrated circuit components, microelectromechanical system (MEMS), passive devices, or a combination thereof. For illustrative purposes, the interface block 404 and the memory block 412, are shown as discrete block although it is understood that any of the blocks can share portions of hardware with other blocks.

In an embodiment, the storage device 400 can be implemented at least in part with the first storage unit 114, the second storage unit 146, or combination thereof. The storage device 412 can include the interface block 404 such as a host interface controller, for communicating, interacting, interfacing, or combination thereof, with a host device such as the first control unit 112, the second control unit 134, or combination thereof. The storage device 400 can provide information, data, instructions, input, output, send, receive, request, response, acknowledgement, or combination thereof.

In an embodiment, the memory block 412 can include partitioning of a memory device 412. For example the memory device 412 can include demand partitions 430 such as a first demand partition 434, a second demand partition 436, a third demand partition 438, or combination thereof. For illustrative purposes, the memory device 412 is shown with three partitions 430 although it is understood that the memory device 412 may include any number of partitions.

In an embodiment, the storage device 400 with the interface block 404 can provide demand or per demand partitioning of the memory block 412. The interface block 404 can provide counting or determining a number of threads 450 of requests 454. The interface block 404 can provide evenly dividing or partitioning the memory block 412 based on the number of the threads 450. For illustrative purposes, the interface block 404 is shown with three of the threads 450 although it is understood that any number of the threads 450 may be included.

For example, the interface block 404 can determine by counting the number of the threads 450 including a first thread 462, a second thread 464, and a third thread 466. The interface block 404 can evenly divide or partition the memory block 412 in three equal partitions based on the three threads. Each of the partitions 430 can serve each of the threads 450, such as the first demand partition 434 can serve the first thread 462, the second demand partition 436 can server the second thread 464, the third demand partition 438 can serve the third thread 466, or combination thereof.

In an embodiment, the interface block 404 can provide partitioning or dividing of the memory block 412, based on the number of threads 450, into three partitions, each with a capacity based on the number of the requests 454 for each of the number threads 450. This per demand partitioning or dividing provides different or proportional partitions of the memory block 412 for each of the first thread 462, the second thread 464, and the third thread 466. For illustrative purposes, the memory device 412 is shown with three partitions 430 and the interface block 404 is shown with three of the number threads 450, although it is understood that the memory device 412 may include any number of partitions and the interface block 404 may include any number of threads 450.

For example, twelve (12) of the requests 454 are shown with eight (8) of the request from the first thread 462, three (3) from the second thread 464, and one (1) from the third thread 466. Thus, based on demand or per demand partitioning, the interface block 404 can provide three (3) partitions with different capacity for the memory 412, including up to two-thirds (2/3) capacity for the first demand partition 434, up to one-quarter (1/4) capacity for the second demand partition 436, and up to one-twelfth (1/12) capacity for the third demand partition 438.

It has been discovered that the electronic system 100 including the storage device 400 with the demand partitions 430 significantly improves system performance and avoids memory starvation problems for significantly improve quality of service (QoS) particularly at thread-level. The interface block 404, the partition block, or combination thereof, can dynamically or actively change demand or per demand partitions, of the memory block 412 such as the first demand partition 434, the second demand partition 436, and the third demand partition 438, or combination thereof.

Figure 5:
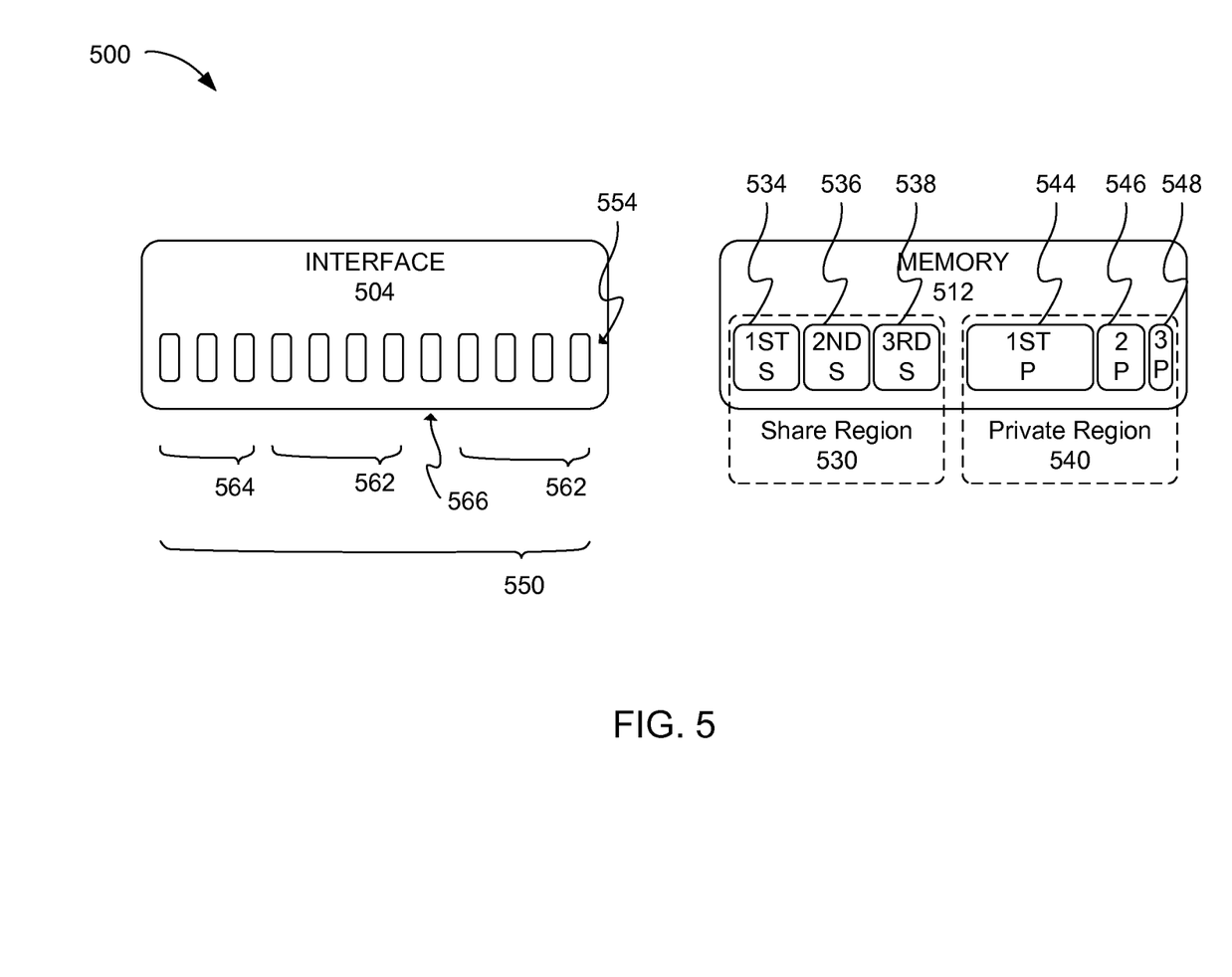
FIG. 5 is a block diagram of a portion of a storage device of the electronic system in an embodiment of the invention.

Referring now to FIG. 5, therein is shown of a portion a block diagram of a memory device 500 of the electronic system 100 in an embodiment of the invention. The storage device 500 is shown for clarity with only an interface block 504 and a memory block 512. For illustrative purposes, the storage device 500 is shown with the interface block 504 and the memory block 512 although it is understood that the storage device 500 may include other components including components of the storage block 200 of FIG. 2. For example, the interface block 304 can include a partition block such as the partition block 208 of FIG. 2.

In an embodiment, the storage device 500 can include an interface block 504, a memory block 512, or combination thereof. The an interface block 504 and the memory block 512 are implemented at least in part as hardware such as integrated circuits, integrated circuit cores, integrated circuit components, microelectromechanical system (MEMS), passive devices, or a combination thereof. For illustrative purposes, the interface block 504 and the memory block 512, are shown as discrete block although it is understood that any of the blocks can share portions of hardware with other blocks.

In an embodiment, the storage device 500 can be implemented at least in part with the first storage unit 114, the second storage unit 146, or combination thereof. The storage device 512 can include the interface block 504 such as a host interface controller, for communicating, interacting, interfacing, or combination thereof, with a host device such as the first control unit 112, the second control unit 134, or combination thereof. The storage device 500 can provide information, data, instructions, input, output, send, receive, request, response, acknowledgement, or combination thereof.

In an embodiment, the memory block 512 can include partitioning of a memory device 512. For example the memory device 512 can include shared partitions 530 such as a first shared partition 534, a second shared partition 536, a third shared partition 538, or combination thereof. The memory device 512 can also include private partitions 540 such as a first private partition 544, a second private partition 546, a third private partition 548, or combination thereof. For illustrative purposes, the memory device 512 is shown with three shared partitions 530 and three private partitions 540, although it is understood that the memory device 512 may include any number of shared partitions 530 and any number of private partitions 540.

In an embodiment, the storage device 500 with the interface block 504 can provide adaptive partitioning of the memory block 512. The interface block 504 can provide counting or determining a number of threads 550 of requests 554. The interface block 504 can provide evenly dividing or partitioning the memory block 512 based on the number of the threads 550. For illustrative purposes, the interface block 504 is shown with three of the threads 550 although it is understood that any number of the threads 550 may be included.

For example, the interface block 504 can determine by counting the number of the threads 550 including a first thread 562, a second thread 564, and a third thread 566. The interface block 504 can evenly divide or partition the memory block 512 in partitions based on the three threads. Each of the shared partitions 530 and the private partitions 540 can serve each of the threads 550, such as the first shared partition 534 and the first private region 544 can serve the first thread 562, the second shared partition 536 and the second private region 546 can server the second thread 564, the third shared partition 538 and the third private region 548 can serve the third thread 566, or combination thereof.

In an embodiment, the shared partitions 530 include uniform partitions implemented with uniform partitioning of the memory block 512. The shared partitions 530 can ensure each of the threads 550 is allocated a dedicated amount or capacity of the memory 512. The private partitions 540 can include demand partition implemented with per demand or demand partitioning. The private partitions 540 can accommodate requirements for input and output (I/O) intensive of the threads 550. A ratio of sizes for the shared partitions 530 and the private partitions 540 can be predetermined, dynamic, or active based on a preset value, setting by the interface 504, setting by the system device 240 of FIG. 2, or combination thereof.

In an embodiment, sizes of the private partitions 540 can be determined by the number of the requests 354 for each of the threads 350, and the shared partitions can be uniformly sized or partitioned based on the number of the thread 350, based on system information such as the system information 242 of FIG. 2. The adaptive partitioning of the memory block 512 with both uniform partitioning and demand or per demand partitioning, can provide significantly improved thread-level quality of service (QoS), with the dedicated amount or capacity of the memory 512 and accommodating or meeting requirements for input and output (I/O) intensive threads 550.

For example, the ratio of sizes for the shared partitions 530 and the private partitions 540 can be equal to one (1). Thus, the shared partitions 530 and the private partitions 540 will be equal in size. The shared partitions 530 can be equally divided or partitioned into three (3) partitions based on the three threads 530 including the first thread 562, the second thread 564, and the third thread 566. The private partitions 540 can be partitioned or divided based on the number of the requests 554 for each of the threads 550, such as two-thirds (2/3) capacity for the first demand partition 534, up to one-quarter (1/4) capacity for the second demand partition 536, and up to one-twelfth (1/12) capacity for the third demand partition 538, in a manner similar to the storage device 400 of FIG. 4.

It has been discovered that the electronic system 100 with the storage device 500 including the shared partitions 530 and the private partitions 540 significantly improves system performance and avoids starvation problems for significantly improve quality of service (QoS) particularly at thread-level. The interface block 504, the partition block, or combination thereof, can dynamically or actively change adaptive partitions of the memory block 412 such as the first shared partition 534, the second shared partition 536, and the third shared partition 538, the first private partition 544, the second private partition 546, and the third private partition 548, or combination thereof.

Figure 6:
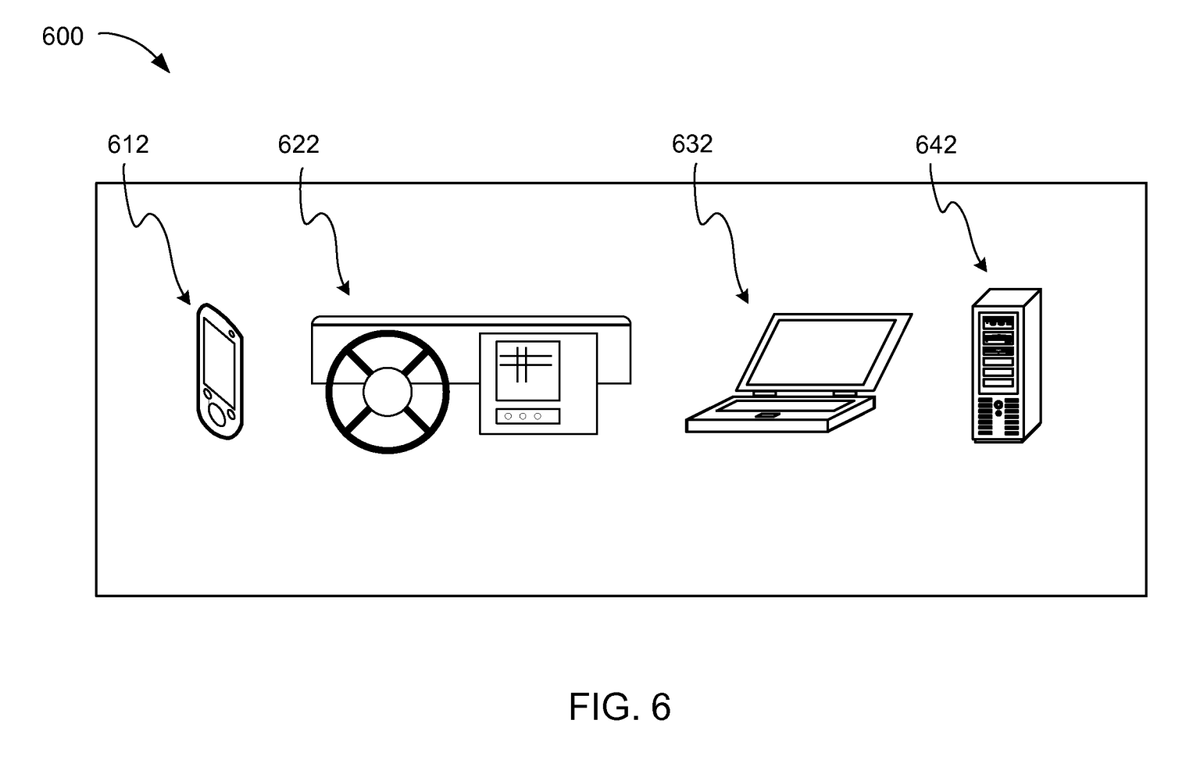
FIG. 6 is examples of embodiments of the electronic system.

Referring now to FIG. 6, therein is shown examples of embodiments of the electronic system 100. The example embodiments of the electronic system 100 with partitioning mechanism can include application examples for the electronic system 100 such as a smart phone 612, a dash board of an automobile 622, a notebook computer 632, a server 642, or combination thereof. These application examples illustrate purposes or functions of various embodiments of the invention and importance of improvements in processing performance including improved bandwidth, area-efficiency, or combination thereof.

For example, the storage device 200 of FIG. 2 can provide significantly improved system performance and avoid memory starvation problems in the electronic system 100 such as a smart phone 612, a dash board of an automobile 622, a notebook computer 632, a server 642, or combination thereof. The storage device 200 can dynamically or actively change partitions of the memory block 212 of FIG. 2.

For example, the storage device 300 of FIG. 3 can provide significantly improved system performance and avoid memory starvation problems in the electronic system 100 such as a smart phone 612, a dash board of an automobile 622, a notebook computer 632, a server 642, or combination thereof. The storage device 300 can dynamically or actively change uniform partitions of the memory block 312 of FIG. 3.

For example, the storage device 400 of FIG. 4 can provide significantly improved system performance and avoid memory starvation problems in the electronic system 100 such as a smart phone 612, a dash board of an automobile 622, a notebook computer 632, a server 642, or combination thereof. The storage device 400 can dynamically or actively change per demand partitions of the memory block 412 of FIG. 3.

For example, the storage device 500 of FIG. 5 can provide significantly improved system performance and avoid memory starvation problems in the electronic system 100 such as a smart phone 612, a dash board of an automobile 622, a notebook computer 632, a server 642, or combination thereof. The storage device 500 can dynamically or actively change adaptive partitions of the memory block 512 of FIG. 3.

In an example where an embodiment of the invention is an integrated physical logic circuit and the storage device 200, the storage device 300, the storage device 400, the storage device 500, or combination thereof, is integrated in the control unit 112, the storage unit 114, or combination thereof, dynamic or active memory partitioning can significantly improve system performance. Various embodiments of the invention provide dynamic or active memory partitioning thereby improving system performance, improving energy efficiency, enabling new memory technologies, enabling compatibility with current memory hierarchies, providing transparent implementation for user applications, or combination thereof.

The electronic system 100, such as the smart phone 612, the dash board of the automobile 622, the notebook computer 632, and the server 642, can include a one or more of a subsystem (not shown), such as a printed circuit board having various embodiments of the invention, or an electronic assembly (not shown) having various embodiments of the invention. The electronic system 100 can also be implemented as an adapter card in the smart phone 612, the dash board of the automobile 622, the notebook computer 632, and the server 642.

Thus, the smart phone 612, the dash board of the automobile 622, the notebook computer 632, the server 642, other electronic devices, or combination thereof, can provide significantly faster throughput with the electronic system 100 such as processing, output, transmission, storage, communication, display, other electronic functions, or combination thereof. For illustrative purposes, the smart phone 612, the dash board of the automobile 622, the notebook computer 632, the server 642, other electronic devices, or combination thereof, are shown although it is understood that the electronic system 100 can be used in any electronic device.

Figure 7:
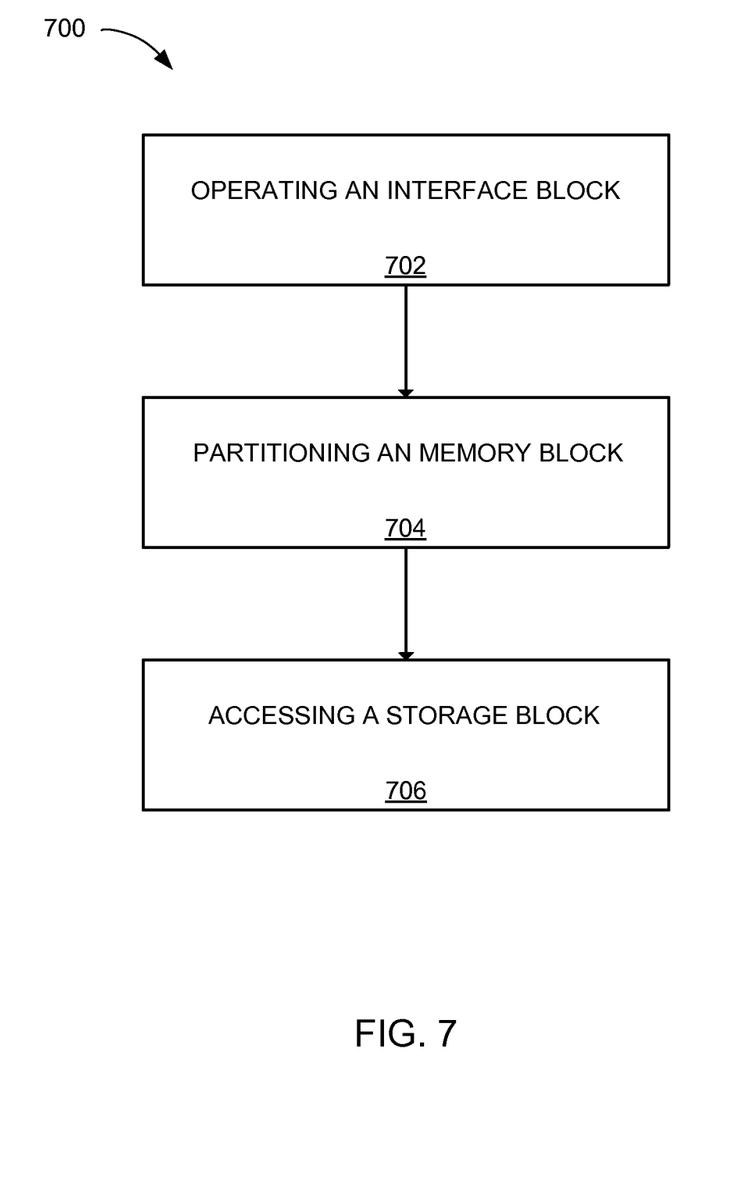
FIG. 7 is a flow chart of a method of operation of the electronic system in an embodiment of the present invention.

Referring now to FIG. 7, therein is shown a flow chart of a method 700 of operation of the electronic system 100 in an embodiment of the present invention. The method 700 includes: operating an interface block of a storage device configured to process system information from a system device in a process 702; partitioning a memory block of the storage device by the interface block configured to process the system information for partitioning the memory block in a process 704; and accessing a storage block of the storage device configured to provide a data block of the storage block to the system device in a process 706. The process 704 further includes identifying the system information. The process 704 further includes associating a request of the system information to a partition of the memory block. The process 704 further includes a partition block for dynamically changing a partition of the memory block. The method 700 further includes translating with a transition block configured to translate the storage block to the system device. The method 700 further includes associating with a partition block configured to associate requests of the system information to a thread of the system information associating with a partition block configured to associate requests of the system information to a thread of the system information. The process 702 further includes providing a non-volatile memory device including the interface block, the memory device, and the storage sub-block.

In an embodiment, the electronic system 100 including the storage device 200 of FIG. 2 avoids performance degradation due to the memory starvation problems. The storage device 200 can dynamically or actively change partitions of the memory, significantly improving system performance and avoiding memory starvation problems.

In an embodiment, the electronic system 100 including the storage device 300 of FIG. 3 significantly improves system performance and avoids memory starvation problems for significantly improve quality of service (QoS) particularly at thread-level. The storage device 300 can dynamically or actively change uniform partitions of the memory.

In an embodiment, the electronic system 100 including the storage device 400 of FIG. 4 significantly improves system performance and avoids memory starvation problems for significantly improve quality of service (QoS) particularly at thread-level. The storage device 400 can dynamically or actively change demand or per demand partitions of the memory.

In an embodiment, the electronic system 100 with the storage device 500 of FIG. 5 significantly improves system performance and avoids starvation problems for significantly improve quality of service (QoS) particularly at thread-level. The storage device 500 can dynamically or actively change adaptive partitions of the memory.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance. These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A storage device comprising:
  a memory block configured as a memory cache;
  an interface block, coupled to the memory block, configured to process system information to determine a number of threads and a number of requests for each of the threads received from a system device;
  a partition block, included in the interface block, configured to partition the memory block into shared partitions and private partitions, wherein:
    each of the shared partitions are evenly divided based on the number of threads,
    the private partitions are proportionally divided based on the number of requests for each of the threads; and
  a storage block, coupled to the memory block, configured to provide a data block.

2. The device as claimed in claim 1 wherein the interface block is configured to identify the system information.

3. The device as claimed in claim 1 wherein the interface block is configured to associate a request of the system information to a partition of the memory block.

4. The device as claimed in claim 1 wherein the partition block is configured to dynamically change a partition of the memory block.

5. The device as claimed in claim 1 further comprising a transition block, coupled to the storage block, configured to translate the storage block to the system device.

6. The device as claimed in claim 1 wherein the partition block is configured to associate requests of the system information to the thread of the system information.

7. The device as claimed in claim 1 wherein the interface block, including the partition block, is configured to process the request with a common identification for distinguishing the request.

8. A method of operation of a storage device comprising:
  processing system information to determine a number of threads and a number of requests for each of the threads received from a system device;
  partitioning a memory block, configured as a memory cache, into shared partitions and private partitions by an interface block, wherein:
    each of the shared partitions are evenly divided based on the number of threads,
    the private partitions are proportionally divided on the number of requests for each of the threads; and
  accessing a storage block to provide a data block.

9. The method as claimed in claim 8 wherein partitioning the memory block by the interface block includes identifying the system information.

10. The method as claimed in claim 8 wherein partitioning the memory block by the interface block includes associating a request of the system information to a partition of the memory block.

11. The method as claimed in claim 8 wherein partitioning the memory block by the interface block includes a partition block for dynamically changing a partition of the memory block.

12. The method as claimed in claim 8 further comprising translating with a transition block configured to translate the storage block to the system device.

13. The method as claimed in claim 8 further comprising associating with a partition block configured to associate requests of the system information to a thread of the system information.

14. The method as claimed in claim 8 wherein processing system information includes processing the request with a common identification for distinguishing the request.

15. A non-transitory computer readable medium including stored thereon instructions for operating a storage device, comprising:
  processing system information to determine a number of threads and a number of requests for each of the threads received from a system device;
  partitioning a memory block, configured as a memory cache, into shared partitions and private partitions by an interface block, wherein:
    each of the shared partitions are evenly divided based on the number of threads,
    the private partitions are proportionally divided based on the number of requests for each of the threads; and
  accessing a storage block to provide a data block.

16. The medium as claimed in claim 15 wherein partitioning the memory block by the interface block includes identifying the system information.

17. The medium as claimed in claim 15 wherein partitioning the memory block by the interface block includes associating a request of the system information to a partition of the memory block.

18. The medium as claimed in claim 15 wherein partitioning the memory block by the interface block includes a partition block for dynamically changing a partition of the memory block.

19. The medium as claimed in claim 15 further comprising translating with a transition block configured to translate the storage block to the system device.

20. The medium as claimed in claim 15 further comprising associating with a partition block configured to associate requests of the system information to a thread of the system information.

* * * * *